July 6, 1926.
R. ATZ
1,591,693
SPRAYING MACHINE
Filed Jan. 15, 1925      2 Sheets-Sheet 1
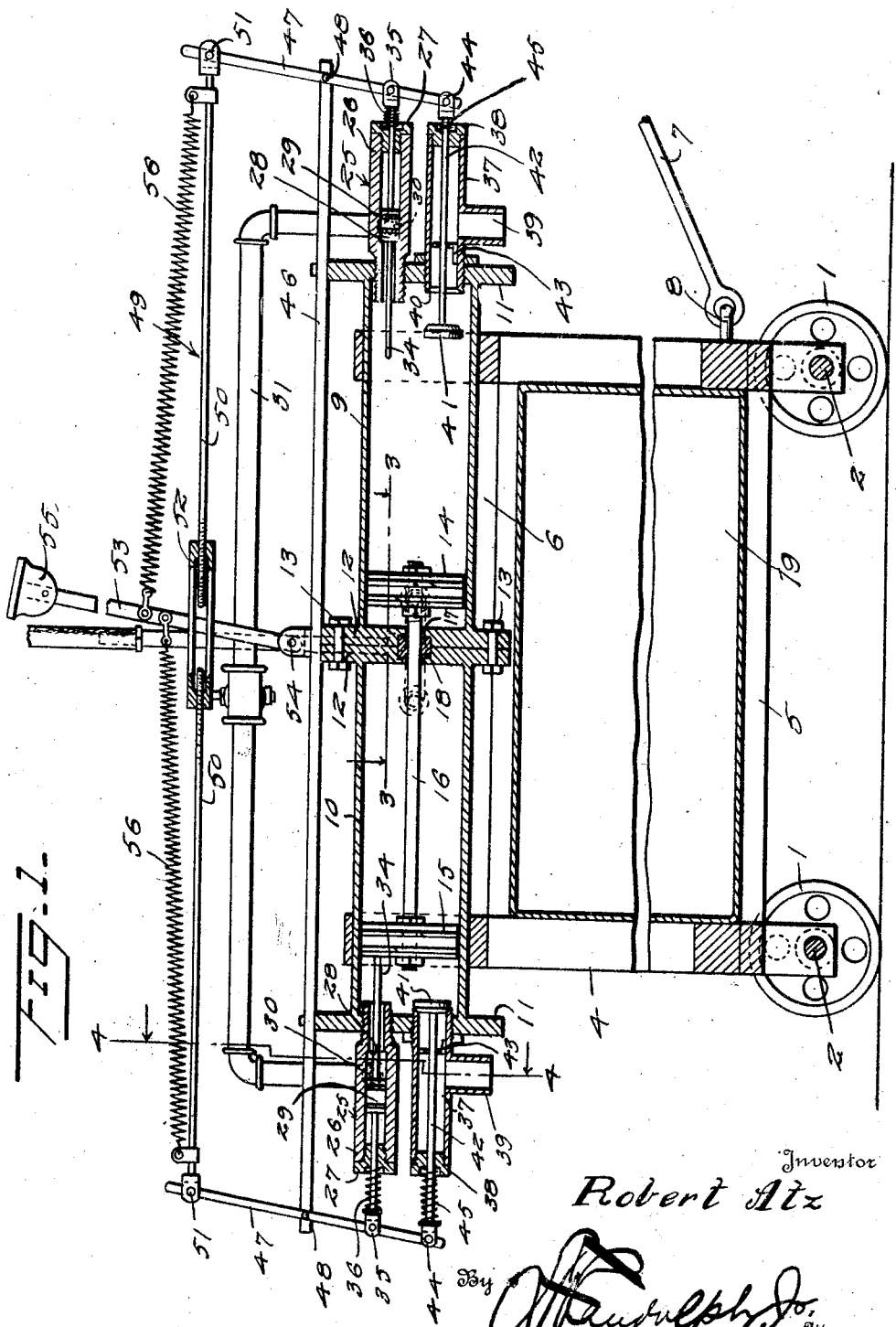
Inventor
Robert Atz
By [signature]
Attorney

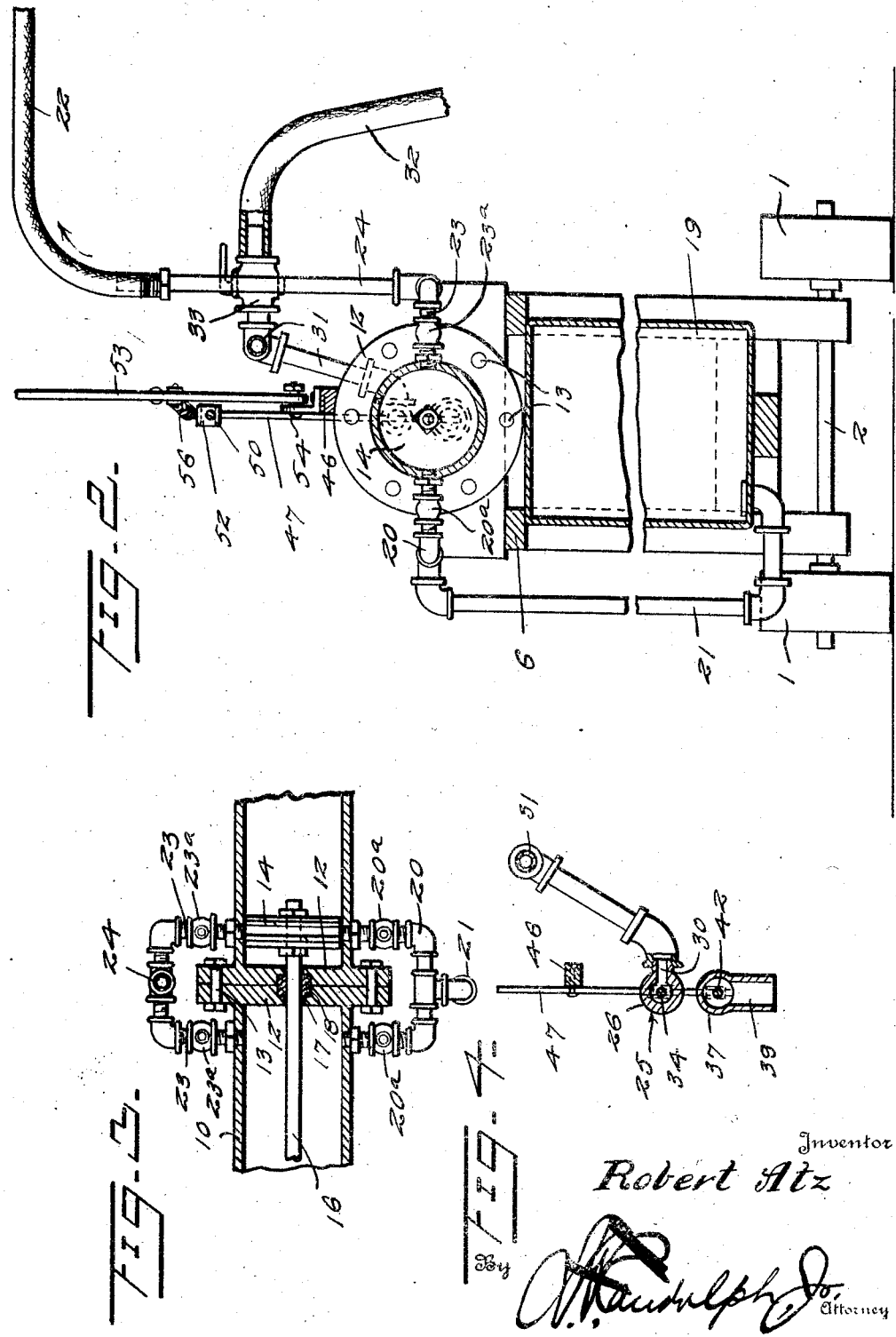

Patented July 6, 1926.

1,591,693

UNITED STATES PATENT OFFICE.

ROBERT ATZ, OF DENVER, COLORADO.

SPRAYING MACHINE.

Application filed January 15, 1925. Serial No. 2,669.

This invention relates to machines for spraying insect destroying solutions onto shade, fruit, and other trees, hedges, bushes and the like, and has for one of its objects to improve and simplify the general construction of machines of this kind and to provide one adapted to be operated by pressure fluid such for instance as water taken from the domestic or any other suitable source of supply.

With the above and other objects in view, the invention consists of the construction, combination and arrangement of parts hereinafter fully described and claimed, and illustrated in the accompanying drawings, wherein:

Figure 1 is a sectional view taken on a vertical plane extending centrally and longitudinally through a spraying machine constructed in accordance with my invention, Figure 2 is a sectional view taken on a vertical plane extending centrally and transversely through the machine, Figure 3 is a detail sectional view taken on the horizontal plane indicated by the line 3—3 of Figure 1, and Figure 4 is a detail sectional view taken on the plane indicated by the line 4—4 of Figure 1.

The machine is mounted upon a wheeled truck so that it may be readily moved from place to place, and this truck comprises ground wheels 1 mounted upon axles 2. A front frame member 3 and a rear frame member 4 are mounted upon the axles 2, and are supported in upright position thereon by lower and upper longitudinal beams 5 and 6. A handle 7, a part only of which is shown, is pivotally connected to the front frame 3 as at 8.

A front cylinder 9 and rear cylinder 10, which are arranged in endwise relation and which extend longitudinally of the truck, are secured to the upper ends of the frame members 3 and 4 in any suitable manner. The cylinders 9 and 10 are similar, and each is provided with an outer flanged head 11 and an inner flanged head 12. Bolts 13 passing through the flanges of the inner heads 12 secure the cylinders 9 and 10 against relative axial and rotary movements. The cylinders 9 and 10 are provided with pistons 14 and 15, respectively, which are connected by a rod 16 for simultaneous forward, backward movements. The rod 16 passes through an opening 17 in the cylinder heads 12, and this opening is provided with a packing to prevent leakage about the rod 16. Adjacent their inner ends, the cylinders 9 and 10 are connected to a storage tank 19 by means of a manifold 20 and a pipe 21 and to a hose 22 by means of a manifold 23 and a pipe 24. The manifold 20 is located at one side of the cylinders 9 and 10 and provided with inwardly opening check valves 20ª. The manifold 23 is located at the other side of the cylinders 9 and 10 and is provided with outwardly opening check valves 23ª. The hose 22 is provided with a suitable nozzle, not shown. Motion is imparted to the pistons 14 and 15 by pressure fluid alternately admitted to the cylinders 9 and 10 at the outer ends thereof. During the travel of the pistons 14 and 15 in each direction spray solution is drawn from the tank 19 into one of the cylinders through the manifold 20 and pipe 21, while the spray solution in the other cylinder is forced therefrom to the hose 22 through the manifold 23 and pipe 24. It will thus be seen that when one piston is drawing the spray solution into its cylinder the other piston is discharging the spray solution from its cylinder, and due thereto a constant stream of spray solution will be passing through the hose 22 during the operation of the engine.

The cylinders 9 and 10 are each provided with an inlet valve 25. These valves comprise tubular casings 26 which are threaded into the cylinder heads 11. The casings 26 are fully open at their inner ends and closed at their outer ends by removable plugs 27. Adjacent their inner ends, the casings 26 are provided with seats 28 for valves 29 and with intake openings 30 which communicate with the discharge ends of a pressure fluid inlet manifold 31. A hose 32 which may be connected at one end to a faucet of a domestic water supply system, or to any other suitable source of water under pressure, is connected at its other end to the intake side of a valve 33. The discharge side of the valve 33 is connected to the manifold 31, and this valve provides means by which the flow of pressure fluid to the cylinders 9 and 10 may be regulated and controlled. The valves 29 when seated cut off communication between the cylinders and the manifold 31, and when unseated communication between the cylinder and manifold is established. The valves 29 are slidably mounted in the casings 26 and have fixed thereto stems 34 which project beyond the inner and outer ends of the casings 26. At their outer ends, the stems 34 are provided with bifurcated heads 35, and coil springs 36 are mounted upon the stems between the plugs 27 and said heads.

Each of the cylinders 9 and 10 is also provided with an exhaust pipe 37. These exhaust pipes have threaded engagement with the cylinder heads 11, and are fully open at their inner ends and closed at their outer ends by removable plugs 38. The exhaust pipes 37 are provided with exhaust ports 39, and are provided at their inner ends with seats 40 for valves 41. Stems 42, which are slidably mounted in the plugs 38 and in brackets 43 arranged within the exhaust pipes 37, carry the valves 41. The outer ends of the stems 42 are provided with enlarged bifurcated heads 44. Coil springs 45 are mounted upon the stems 42 between the plugs 38 and the heads 44. The valves 41 when seated cut off communication between the cylinders and exhaust ports 39 and when unseated communication between the exhaust cylinders and exhaust ports is established.

A bar 46 is mounted upon and fixed to the cylinder heads 11 and 12. The ends of this bar project beyond the outer ends of the casings 26 and the exhaust pipes 37. Levers 47 are pivoted intermediate their ends to the ends of the bar 46. The levers 47 are vertically arranged, and are connected below their pivots 48 with the heads 35 of the stems 34 and the heads 44 of the stems 42. Above their pivots 48, the levers 47 are connected by a rod 49 which consists of sections 50 pivotally connected at their outer ends as at 51 to the levers 47 and connected at their inner ends by a turn buckle 52. Due to the manner in which the stems 34 and 42 of the respective cylinders are connected by the respective levers 47, an inlet valve 29 will be seated when its companion outlet valve 41 is unseated, and unseated when its companion outlet valve is seated. Due to the manner in which the levers 47 are connected, the inlet valve 29 and outlet valve 41 of one cylinder will be respectively seated and unseated when the inlet valve 29 and outlet valve 41 of the other cylinder will be respectively unseated and seated.

The pistons 14 and 15 are adapted during their travel to contact with the inner ends of the stems 34, with the result that the valves are actuated in a manner to alternately connect the respective cylinders with the intake manifold 31 and the atmosphere. The valves are adapted to be maintained against casual movement in the positions into which they have been moved as the result of the actuation thereof by the pistons 14 and 15 by means of a counter-balanced lever 53. This lever is arranged vertically and is pivoted at its lower end to the cylinder flanges 12 as at 54. The upper end of the lever is provided with a weight 55, and it is connected to the rod 49 by springs 56.

From the foregoing description, taken in connection with the accompanying drawings, the advantages of the construction and of the method of operation of the device should be readily apparent to those skilled in the art to which it appertains. While I have described the principle of operation of the invention, together with the device which I now consider to be the best embodiment thereof, I desire to have it understood that the device shown is merely illustrative and that such changes may be made therein when desired as are within the scope of the invention as claimed.

What is claimed is:

1. A spraying machine comprising a tank, a pair of cylinders arranged in endwise relation, a manifold having check valves and communicating with the cylinders adjacent the inner ends of the latter, an inlet pipe communicating with the manifold and tank, a second manifold communicating with the cylinders adjacent the inner ends of the latter and provided with check valves, a discharge pipe connected to the last named manifold, a piston arranged in each cylinder, a rod connecting the pistons, and means at the outer ends of the cylinders for controlling the admission of pressure fluid to and its escape from the cylinders, each of said means including an inlet and an exhaust valve, a lever connected to each of the valves of each of said means, and operating means connecting the levers.

2. A spraying machine comprising a tank, a pair of cylinders arranged in endwise relation, means establishing communication between the inner ends of the cylinders and tank independently of the meeting ends of the cylinders, a discharge pipe, means establishing communication between the inner ends of the cylinders and the discharge pipe, and intake and exhaust valves located at the outer end of each cylinder, means connecting the valves of each cylinder, and means connecting the valves of both cylinders.

3. A spraying machine comprising a tank, a pair of cylinders arranged in endwise relation, means establishing communication between the inner ends of the cylinders and the tank, a discharge pipe, means establishing communication between the inner ends of the cylinders and the discharge pipe, a piston actuated intake and exhaust valve at the outer end of each cylinder, levers connecting the valves of each cylinder, means connecting the levers, and means connected to the last named means and adapted to normally hold the valves against movement.

4. A spraying machine comprising a tank, cylinders arranged in endwise relation, means establishing communication between the inner ends of the cylinders and the tank, a discharge pipe, means establishing communication between the inner ends of the cylinders and the discharge pipe, a piston actuated intake and exhaust valve at the outer end of each cylinder, the outer ends of said cylinders and the inner ends of said cylinders being outwardly flanged, a bar secured to the flanges, levers pivoted to the ends of said bar, valves of the respective cylinders being pivoted to the respective levers, an operating lever pivoted to the cylinders adjacent their junction, and resilient means extending from the operating lever to the first mentioned levers.

In testimony whereof I affix my signature.

ROBERT ATZ.